United States Patent
Kneer et al.

(10) Patent No.: US 6,682,201 B2
(45) Date of Patent: Jan. 27, 2004

(54) DIAL

(75) Inventors: Bernward Kneer, Karlstein (DE); Ingo Kopsieker, Seligenstradt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/023,965

(22) Filed: Dec. 18, 2001

(65) Prior Publication Data

US 2002/0089837 A1 Jul. 11, 2002

(30) Foreign Application Priority Data

Dec. 22, 2000 (DE) .......................... 100 64 759

(51) Int. Cl.⁷ .............................................. G01D 11/28
(52) U.S. Cl. ........................ 362/26; 362/30; 362/330; 116/287
(58) Field of Search ............................ 362/489, 330, 362/351, 23, 26, 30; 116/288, 287, 286

(56) References Cited

U.S. PATENT DOCUMENTS

| | | | | |
|---|---|---|---|---|
| 4,761,715 A | * | 8/1988 | Brooks | 362/23 |
| 4,872,415 A | * | 10/1989 | Nakadozono et al. | 116/288 |
| 5,934,782 A | * | 8/1999 | Atkins et al. | 362/26 |
| 5,949,346 A | * | 9/1999 | Suzuki et al. | 340/815.45 |
| 6,224,221 B1 | * | 5/2001 | Glienicke | 362/23 |
| 6,356,394 B1 | * | 3/2002 | Glienicke | 359/641 |
| 6,422,710 B1 | * | 7/2002 | Herzog et al. | 362/23 |

* cited by examiner

Primary Examiner—Thomas M. Sember
Assistant Examiner—Hargobind S. Sawhney
(74) Attorney, Agent, or Firm—Martin A. Farber

(57) ABSTRACT

A dial for an indicating instrument, in particular in a motor vehicle. The dial comprises an optically conducting basic body whose outside is shaped as a two-stage cone. Except for light passages (10) forming symbols, the outside is covered by an opaque layer (9), the light, which hag previously been coupled into the basic body (2), exiting there. A special feature is that the basic body (2) is produced by injection molding, and this permits the production of a non-planar outer surface, the opaque layer (9) itself being produced on the outer surface.

11 Claims, 1 Drawing Sheet

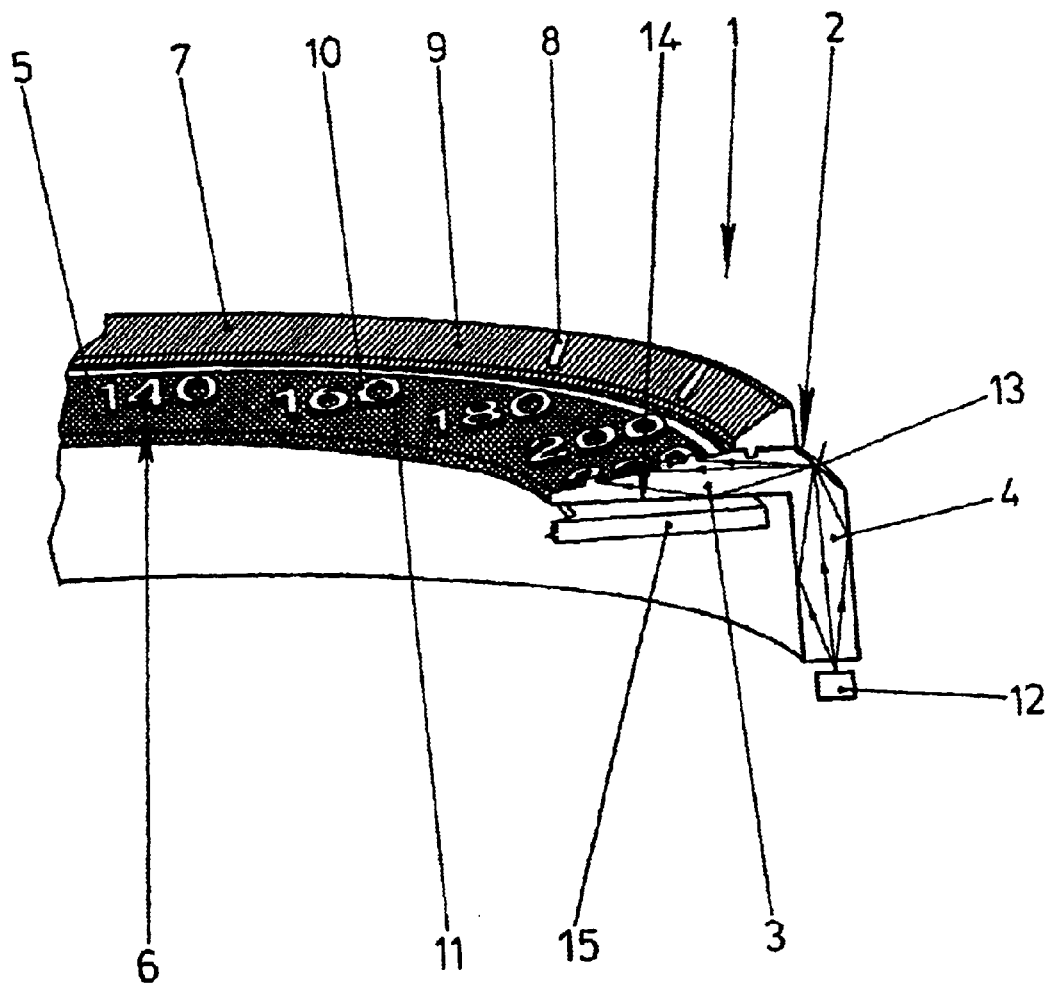

DIAL

FIELD AND BACKGROUND OF THE INVENTION

The invention relates to a dial for an indicating instrument, in particular in a motor vehicle, having an optical conductor as basic body with symbols displayed on its outside, which faces the viewer, for which purpose there is located on the outside a substantially opaque layer which is provided with light passages forming the symbols. Said layer is substantially opaque in this case, because complete capacity can be accomplished technically only with a very high outlay, which is not economically acceptable in mass production. What is important is that the opaque layer and the light passages forming the symbols have a high contrast, In general, the basic body is produced from an optically conducting material, for example from polycarbonate or PMMA. The outside is flat, and so a previously produced foil which is generally opaque but provided with light passages forming the symbols can be bonded onto the smooth surface.

A plurality of disadvantages arise in this method. Firstly, the shaping option is restricted; specifically, the foil can be bonded only onto a flat surface, in the final analysis. Secondly, the production method is relatively complicated, since the opaque layer must be produced separately as a foil, for example by screening printing. A further disadvantage consists in that it is therefore necessary for two components to be produced and controlled logistically separately from one another.

SUMMARY OF THE INVENTION

The invention is based on the problem of creating a dial for an indicating instrument which overcomes the above-named disadvantages. It is proposed for this purpose that the basic body be produced by injection molding and that the outside have surface regions with the light passages that are inclined relative to one another.

The limitation of the shaping option is firstly overcome with these features. Depending on their meaning, symbols can respectively be constructed on differently inclined surfaces such that the indicating instrument can be read off more effectively overall. The basic bodies for indicating instruments with light passages are certainly known from the prior art, but the basic body does not serve as optical conductor in them. Moreover, the light passages act only as light sources which illuminate the outsides of the basic body which bear the dial.

A particularly suitable form in which to construct the surface regions inclined relative to one another consists in shaping an inwardly situated annular region and a more outwardly situated annular region, whose outer surfaces respectively form conical surfaces which are inclined relative to one another. Thus, for example, the conical surface of the outer annular region can be steeper than that of the inner annular region. With this shaping, it is possible, for example, to apply the scale for indicating speed to the inwardly situated annular region, whereas further informative markings are present in the outer annular region.

The symbols—that is to say chiefly the numerals of a speed or rotational speed display—stand out particularly prominently when they are constructed on raised surfaces of elevations the sides of which are opaque. This produces the impression as if the numerals were floating in front of the background, something which permits a particularly esthetic shaping.

A further advantage of the invention is present whenever the opaque layer is produced on the outer surface. This means that the layer is not produced in advance in a separate production run, for example as adhesive film, but is produced directly by applying opaque material to the basic body. This layer is therefore produced firstly on the basic body. Both methods for applying such a layer are sufficiently known. For example, it is possible to think of applying a surface coating in liquid form or spraying it on as mist.

In this case, in order to produce the light passages, it is possible, firstly, to apply a stencil in advance and remove it after the opaque layer has been applied. Another possibility consists in producing the light passages by removal, for example by thermal or mechanical processing, of the layer in the appropriate regions.

Finally, the way of producing the opaque layer and the production of the basic body by injection molding are in cooperation. A multivarious structure of the dial can be achieved by applying both features. The display possibilities are substantially more versatile than in the case of the method mentioned in the prior art.

In order to couple the light into the basic body, the latter is formed from a disk, preferably a perforated disk, on whose outer surface the symbols are constructed, and from a ring running at right angles thereto, the light being coupled in at the free lower edge of the ring from a light source, for example a light-emitting diode. The light is directed into the disk, advantageously via a reflecting surface in the transition between the disk and ring, and exits through the light passages.

An advantageously particularly high light yield and bright illumination of the symbols results when the side of the basic body opposite the symbols is designed to scatter light.

BRIEF DESCRIPTION OF THE DRAWINGS

The invention is explained in more detail below with the aid of an exemplary embodiment illustrated in a single FIGURE.

DETAILED DESCRIPTION OF THE PREFERRED EMBODIMENT

Represented in the FIGURE is a perspective illustration of a quarter of an annular dial, one end of the illustration being shown in section.

The dial 1, which is a constituent of an indicating instrument, not illustrated further here, of a motor vehicle, comprises a basic body 2, which in turn comprises a disk 3 and a ring 4 running perpendicular thereto. The result is a design which is L-shaped in section and thereby has sufficient stability. The basic body 2 is produced by injection molding from an opaque material, for example polycarbonate or PMM, it also being possible, for example, to color the basic body 2 as desired.

The outside of the disk 3 comprises a two-stage conical surface which is inclined toward the center of the basic body 2. In this case, an inwardly situated annular region 5 is provided on which the numerals 6 of a speed display are applied, and a substantially more steeply running outwardly situated annular region 7 with markings 8. The part of the basic body 2 which has the outwardly situated annular region 7 can be designed as a separate part of the basic body 2 which is plugged together with the remainder in order to form the overall basic body.

The outside of the two annular regions 5, 7 are coated with an opaque layer 9 which has been, for example, painted on.

This opaque layer 9 has light passages 10 which form the symbols, for example the numerals 6 and the markings 8. The light passages 10 are produced by removing again the opaque layer 9 in the light passages 10 which was previously applied throughout.

The light passages 10, which form the numerals 6, are constructed on elevations 11 in the form of numerals, the opaque region being constructed on the raised surface, while the sides of the elevations 11 are respectively opaque.

One or more LEDs 12 are present at the lower free edge of the ring 4. The light enters the basic body 2 through the lower entrance surface at the ring 4 and is laterally coupled, via a reflecting surface 13, into the disk 3 where it exits through the light passages 10, and the symbols, that is to say the numerals 6 and markings 8, can be detected as luminous surfaces against the opaque coating 9. A side 14 of the basic body 2 opposite the symbols is designed to scatter light diffusely, as a result of which light is deflected in the direction of the symbols and the symbols are effectively illuminated.

A light-reflecting wall 15, formed from a white plastic, for example, in the indicating instrument ensures that the light yield is high—despite light losses from the basic body 2 which cannot be avoided.

We claim:

1. A dial for an indicating instrument, in particular in a motor vehicle, comprising an optical conductor as a basic body with symbols displayed on its outside, which faces a viewer, wherein said outside has a substantially opaque layer which is provided with light passages forming the symbols, wherein the basic body (2) is produced by injection molding and the outside has surface regions (5, 7) with the light passages (10) which are inclined relative to one another, wherein the basic body (2) has an inwardly situated annular region (5) and a more outwardly situated annular region (7), whose outsides are formed in each case by a conical surface, the conical surface of the outwardly situated annular region (7) being steeper than that of the inwardly situated annular region (5).

2. The dial, as claimed in claim 1, wherein the symbols are formed from raised regions of an outer surface, the light passages (10) being present on a top side of elevations (11), while the edges are opaque.

3. The dial as claimed in claim 1, wherein the opaque layer (9) is produced on an outer surface of the basic body (2).

4. The dial as claimed in claim 3, wherein the opaque layer (9) is applied using a coating method.

5. The dial as claimed in claim 3, wherein the light passages (10) are produced by partially removing the opaque layer (9).

6. The dial as claimed in claim 1, wherein the basic body (2) is provided on its underside with an optically conducting ring (4) which is aligned perpendicular to a disk (3) bearing a coated outer surface, the light being coupled into a free edge of the ring (4).

7. The dial as claimed in claim 6, wherein a reflecting surface (13) is constructed in the transition between the ring (4) and the disk (3).

8. The dial as claimed in claim 1, wherein a side of the basic body (2) opposite the symbols is designed to scatter light.

9. The dial as claimed in claim 1, wherein the outwardly situated annular region is produced separate from said basic body and in selectively attached thereto to form said dial.

10. The dial as claimed in claim 1, wherein a side of said basic body opposite said symbols scatters light diffusely in order to deflect the light in the direction of the symbols thereby effectively illuminating said symbol.

11. A dial for an indicating instrument, in particular in a motor vehicle, comprising an optical conductor as a basic body with symbols displayed on its outside, which faces a viewer, wherein said outside has a substantially opaque layer provided with light passages forming the symbols, wherein said opaque layer is produced on an cuter surface of said basic body and applied to said basic body using a coating method, wherein the basic body (2) is produced by injection molding and the outside has surface regions (5, 7) with the light passages (10) which are inclined relative to one another, wherein the basic body (2) has an inwardly situated annular region (5) and a more outwardly situated annular region (7), whose outsides are formed in each came by a conical surface, the conical surface of the outwardly situated annular region (7) being steeper than that of the inwardly situated annular region (5).

* * * * *